US006741257B1

United States Patent
Retika (10) Patent No.: US 6,741,257 B1
(45) Date of Patent: May 25, 2004

(54) GRAPHICS ENGINE COMMAND FIFO FOR PROGRAMMING MULTIPLE REGISTERS USING A MAPPING INDEX WITH REGISTER OFFSETS

(75) Inventor: John Y. Retika, San Jose, CA (US)

(73) Assignee: NeoMagic Corp., Santa Clara, CA (US)

( * ) Notice: Subject to any disclaimer, the term of this patent is extended or adjusted under 35 U.S.C. 154(b) by 0 days.

(21) Appl. No.: 10/248,431

(22) Filed: Jan. 20, 2003

(51) Int. Cl.[7] .................................................. G09G 5/36
(52) U.S. Cl. ......................................... 345/558; 345/559
(58) Field of Search ................................. 345/558, 560, 345/559, 530, 501, 562, 561, 522; 711/202, 100; 710/100

(56) References Cited

U.S. PATENT DOCUMENTS

| | | | |
|---|---|---|---|
| 3,665,175 A | 5/1972 | Bouricius et al. ............... 714/8 |
| 5,142,668 A | 8/1992 | Priem et al. ................. 345/627 |
| 5,212,795 A | 5/1993 | Hendry ........................ 710/289 |
| 5,446,859 A | 8/1995 | Shin et al. ................... 711/100 |
| 5,488,694 A | 1/1996 | McKee et al. ................... 710/4 |
| 5,511,210 A | 4/1996 | Nishikawa et al. ............. 712/5 |
| 5,619,658 A | * 4/1997 | Priem et al. ................. 710/100 |
| 5,796,413 A | 8/1998 | Shipp et al. ................. 345/522 |
| 5,835,965 A | 11/1998 | Taylor et al. ................ 711/211 |
| 5,966,142 A | 10/1999 | Harkin ........................ 345/522 |
| 6,021,498 A | 2/2000 | Wisor et al. ................. 713/300 |
| 6,028,613 A | 2/2000 | Larson ........................ 345/522 |
| 6,189,082 B1 | 2/2001 | Ramamurthy ............... 711/202 |
| 6,313,845 B1 | 11/2001 | Terry et al. .................. 345/537 |
| 6,339,427 B1 | * 1/2002 | Laksono et al. ............. 345/553 |
| 6,570,573 B1 | * 5/2003 | Kazachinsky et al. ...... 345/558 |

* cited by examiner

Primary Examiner—Kee M. Tung
(74) Attorney, Agent, or Firm—Stuart T. Auvinen (57) ABSTRACT

A host writes graphics commands and data to programmable registers through a command FIFO that is read by a graphics controller or BitBlt engine. Rather than write an address and a data value for each register programmed, the host writes one address, one index, and several data values. The address points to an index register. The index is a mapping index word with several multi-bit mapping fields. Each multi-bit mapping field in the index identifies a register to be programmed with one of the data values. Since N bits are used for each mapping field, the mapping field can select one register in a bank of $2^N-1$ registers. The registers in the bank can be programmed in any order, and registers can be skipped. Since only one index is stored in the command FIFO for programming several registers, less memory space and fewer bus cycles are required.

20 Claims, 6 Drawing Sheets

PRIOR ART

FIG. 4

PRIOR ART

GRAPHICS ENGINE COMMAND FIFO FOR PROGRAMMING MULTIPLE REGISTERS USING A MAPPING INDEX WITH REGISTER OFFSETS

BACKGROUND OF INVENTION

This invention relates to graphics systems, and more particularly to addressing of programmable registers.

Personal computers (PCs) and other computer systems have a variety of controller integrated circuits (ICs) or chips that control subsystems such as for graphics, disks, and general system logic. Such controller chips are usually programmable. For example, the graphics controller can be programmed with the display resolution, such as the number of pixels in a horizontal line, or the number of lines on a screen. Memory-controller chips can be programmed with numbers of clock cycles for memory accesses, so that the timing signals generated by the controller chip can be adjusted for faster memory chips or faster bus clocks.

Advanced graphics systems often employ specialized engines, such as a bit-block-transfer BitBlt engine. Graphics data and commands can be written to a command first-in-first-out (FIFO) by a host processor, allowing the BitBlt engine to read and process graphics data and commands at its own pace.

The host microprocessor's address space is typically partitioned into memory and input/output (I/O) address spaces. While a large memory address space such as 4 GigaBytes (32 address bits) is provided, the I/O address space is typically much smaller, perhaps only 64 Kbytes (16 address bits). I/O addresses are used for accessing peripheral devices such as I/O ports, disk drives, modems, mouse and keyboard, and the controller chips. Often certain ranges of I/O addresses are reserved for certain types of peripherals, such as graphics, disks, and parallel ports. Thus the number of I/O addresses available to a peripheral controller chips is often limited.

Some of the programmable registers may be assigned addresses in the memory space rather than the I/O space. Since memory accesses are often faster than I/O accesses, memory-mapped registers can be accessed more quickly, improving performance. Frequently-accessed registers are often memory-mapped rather than I/O.

Figure 1:
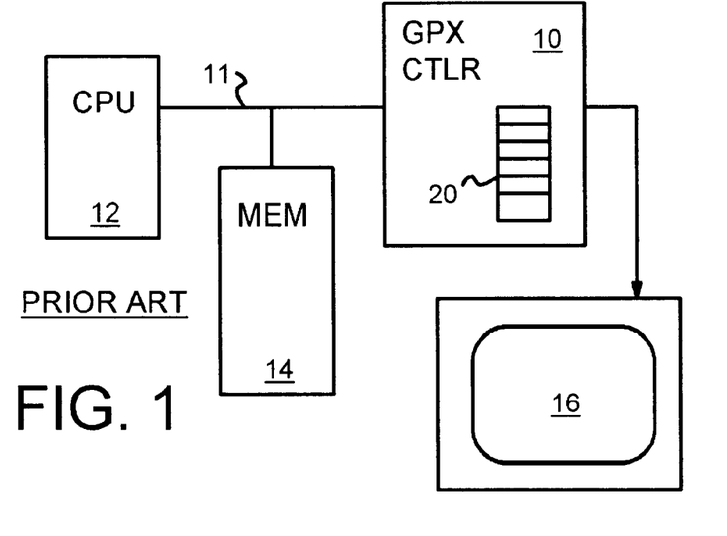
FIG. 1 shows a computer system with a controller chip with programmable registers.
Figure 2:
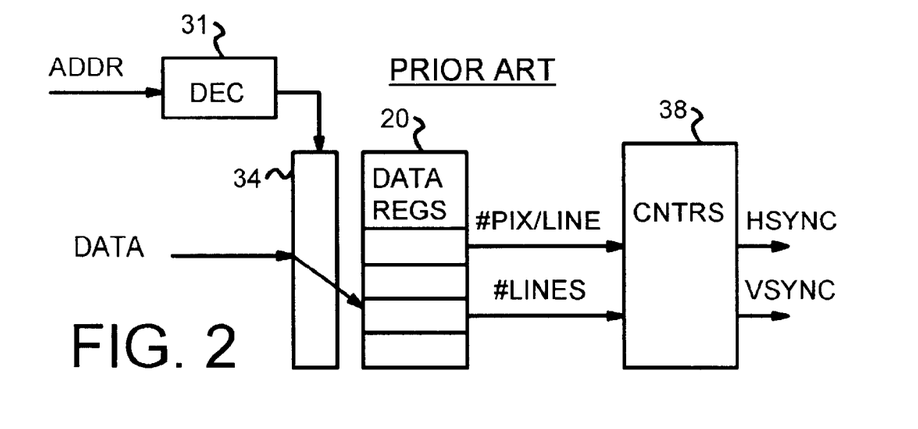
FIG. 2 highlights an address decoder that selects a data register for access.

Programmable Registers FIGS. 1, 2

FIG. 1 shows a computer system with a controller chip with programmable registers. A central processing unit (CPU) 12 is a microprocessor that executes instructions in a program stored in memory 14 or in a BIOS ROM (not shown). Display 16 is controlled by graphics controller 10. Programs executing on CPU 12 can update the information shown on display 16 by writing to a frame buffer inside or controlled by graphics controller 10. Graphics controller 10 reads lines of pixels from the frame buffer and transfers them to display 16, which can be a cathode-ray tube (CRT) monitor or a flat-panel display.

Bus 11 connects CPU 12 and graphics controller 10, and includes an address bus and a data bus. Bus 11 may be divided into separate sections by buffer chips. Often a high-speed bus such as a PCI (Peripheral Component Interconnect) or AGP (Accelerated Graphics Port) bus is used to connect to graphics controller 10.

Graphics controller 10 includes programmable registers 20 that control various features. For example, power-saving modes, display characteristics, timing, and shading can be controlled by CPU 12 writing to programmable registers 20. Registers are frequently written during 3D rendering or bitblt operations.

FIG. 2 highlights an address decoder that selects a data register for access. A shared address/data bus is used where the address is output during a first bus cycle while the data is output during a second bus cycle. During a first bus cycle, the CPU outputs an address on the bus to decoder 31. This address is decoded by decoder 31, causing selector 34 to selects one of the registers in programmable register 20 for access. The other programmable registers are deselected and cannot be accessed until a new address is written to decoder 31.

In the second bus cycle, the CPU writes a data value to the bus. The data written by the CPU is written through selector 34 to the register in programmable registers 20 that was selected by the address in decoder 31. The CPU may also read the selected register rather than write the selected register since selector 34 provides a bi-directional data path, depending on the read/write control signal from the CPU. For the PCI bus, address decoding takes 1, 2, or 3 clock cycles and data is written on the fourth clock cycle. A two-cycle idle time is necessary. Thus each PCI bus transaction requires 6 clock cycles.

The values written to programmable registers 20 are used to control features of the controller chip. For example, programmable registers 20 can output a number of pixels per horizontal line, and a number of lines in a screen, to counters 38 in a graphics controller. When the number of pixels written to the display matches the value of pixels/line from programmable registers 20, then a horizontal sync HSYNC pulse is generated. When the number of lines counted matches the total number of lines from programmable registers 20, then the vertical sync VSYNC is generated. Controls for windows within a screen can likewise come from programmable registers 20, such as for a movie window as described in Transparent Blocking of CRT Refresh Fetches During Video Overlay Using Dummy Fetches, U.S. Pat. No. 5,754,170 by Ranganathan et al., and assigned to NeoMagic Corp.

Figure 3:
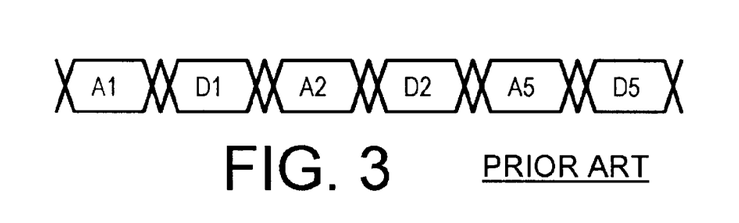
FIG. 3 shows standard bus cycles to program registers.

FIG. 3 shows standard bus cycles to program registers. During the first bus cycle, a first address A1 is output on the bus from the CPU to the controller chip. Address A1 is the address of a first programmable register. In the second bus cycle, data D1 is output on the bus from the CPU to the controller chip. The controller chip stores data D1 from the bus into the programmable register for address A1.

A second data value is written to a second programmable register during the third and fourth bus cycles. Address A2 is output during the third bus cycle while data D2 is output during the fourth bus cycle. The controller chip writes data D2 to the register identified by address A2. A third data value is written to another programmable register in the fifth and sixth bus cycles. Data D5 is written to the controller chip's register for address A5.

Each programmable register written requires a 2-bus-cycle access where the address is followed by the data. The programmable registers can be written in any order, but the correct address must precede the data value in each pair of bus cycles. Data may be read rather than written to the programmable registers by not asserting a write signal from the CPU.

Figure 4:
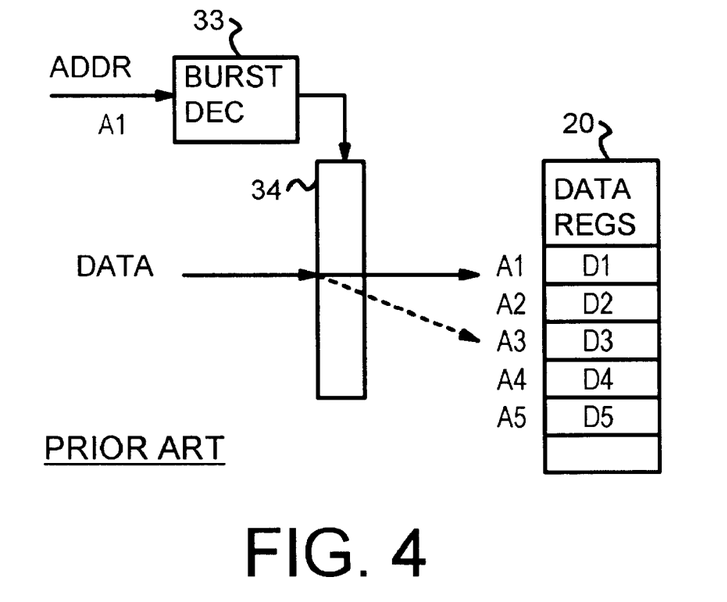
FIG. 4 is a diagram of data being bursted into programmable registers.
Figure 5:
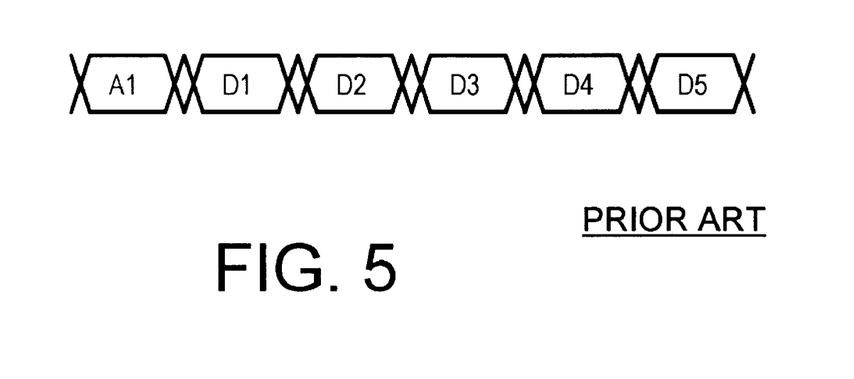
FIG. 5 is a timing diagram of a burst access of programmable registers.

Burst Access FIGS. 4, 5

High-speed busses often support higher data bandwidth using a burst access, ring a burst-access cycle, the address input in the first bus cycle is followed by several data values input over several bus cycles. A predefined burst order is used to determine the addresses of the data values in the burst sequence.

FIG. 4 is a diagram of data being bursted into programmable registers. Burst decoder 33 receives a starting address A1 during a first bus cycle. Selector 34 routes the data to the A1 data register in programmable registers 20 having the starting address (A1) in the second bus cycle.

During the next 3 bus cycles, data values are received without addresses. The addresses of these three data values are implied by the burst rules. The burst rules define the address order during burst cycles. For purely sequential burst rules, the implied addresses of the next 3 data values are A1+1, A1+2, and A1+3. Often the burst addresses are interleaved so the addresses are somewhat mixed in order: A1+2, A1+1, then A1+3. The burst order is usually a fixed order defined by the architecture. Although a purely sequential burst is used as the example, other semi-sequential or interleaved burst orders may be substituted. The burst sequence is usually for sequential addresses (1,2,3,4), or semi-sequential addresses (1,3,2,4, or 1,4,2,3, or others) in some predefined sequence.

During the third bus cycle, burst decoder 33 causes selector 34 to route the second data value D2 to the next data register (A2) in programmable registers 20. Then in the fourth bus cycle, burst decoder 33 causes selector 34 to route the third data value D3 to the third data register (A3) in programmable registers 20. Finally, in the fifth bus cycle, burst decoder 33 causes selector 34 to route the fourth data value D4 to the fourth data register (A4) in programmable registers 20.

FIG. 5 is a timing diagram of a burst access of programmable registers. In the first bus cycle, address A1 is sent from the CPU to the controller chip. This is the starting address of the burst access, identify the first data register to be written. In the second bus cycle, data value D1 is sent to the controller chip and written into the A1 programmable register. Then in the third bus cycle, data value D2 is written to the A2 register. In the fourth bus cycle, data value D3 is written to the A3 register, while in the fifth bus cycle, data value D4 is written to the A4 register. The burst can stop after four data values are written, or continue with data value D5 being written to the A5 register.

Only the starting address A1 was written to the controller chip. The other addresses A2, A3, A4, A5 were not sent across the bus from the CPU to the controller chip. These addresses are implied by the burst rules.

Since only one address is sent for four or more data values, more of the bus bandwidth is used for data transfers than for address transfers. This improves the efficiency of the bus, allowing data to be written to the controller chip more quickly. Higher performance results.

The data values burst in must exactly follow the burst sequence defined by the burst rules. Data cannot be written out of order without stopping the burst and inputting a new address.

Figure 6:
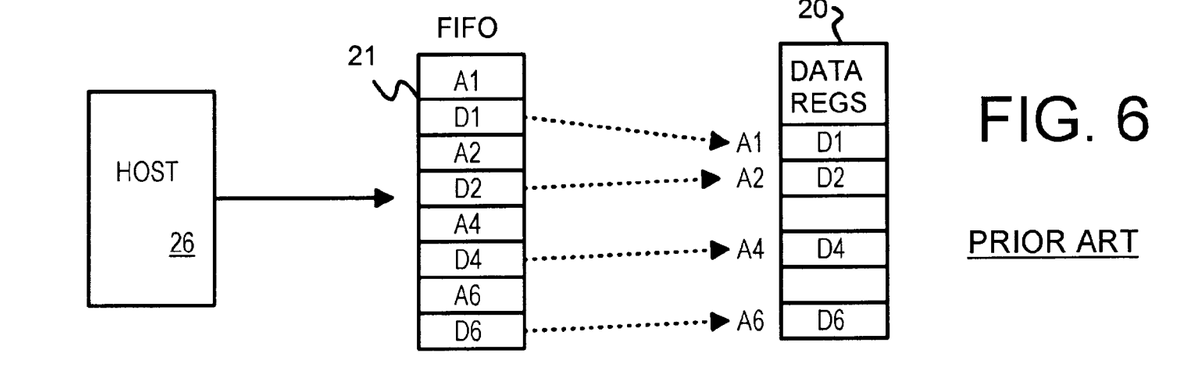
FIG. 6 shows that non-sequential programmable registers are sometimes accessed.
Figure 7:
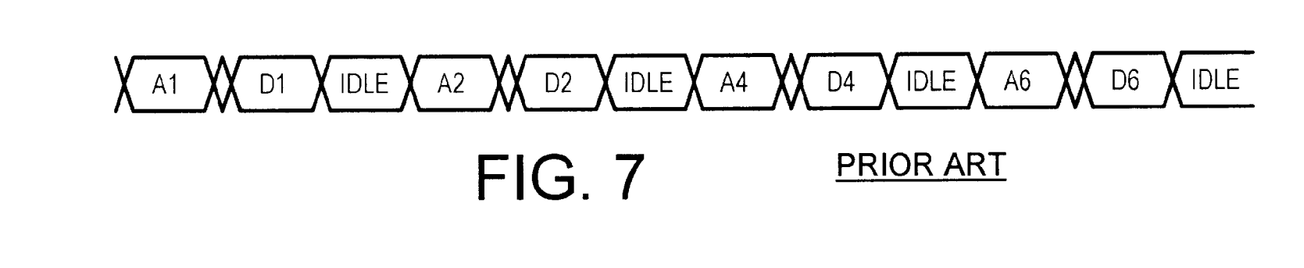
FIG. 7 is a timing diagram of writing to non-sequential programmable registers from the command FIFO.

Non-Sequential Register Access Using Command FIFO FIGS. 6, 7

FIG. 6 shows that non-sequential programmable registers are sometimes accessed. Often programs or software drivers only need to update some of the programmable register while other programmable registers are not updated. Host 26 can write graphics commands and data to command FIFO 21. For each register in programmable registers 20 that is to be written, two entries are written to command FIFO 21. The first entry is an address of the programmable register, while the second entry is the data or command to be written to the programmable register.

For example, the first pair in command FIFO 21 is the pair or entries A1, D1. Data D1 is to be written to the register at address A1. In the example of FIG. 6, only registers A1, A2, A4, and A6 in programmable registers 20 need to be updated. Registers A3 and A5 do not need to be written. Host 26 can use burst cycles to fill command FIFO 21, but the graphics controller or BitBLt engine does not use burst cycles to write to programmable registers 20 from read command FIFO 21, since the registers written are out-of-sequence. Using a burst access to write programmable registers 20 would require that the intervening registers A3, A5 also be written.

FIG. 7 is a timing diagram of writing to non-sequential programmable registers from the command FIFO. Since registers A3, A5 are not being written, a burst access to write the registers is not possible. Standard address-data cycles are used, and the data registers are programmed one at a time.

In the first and second bus cycles address A1 and data D1 are sent to the controller chip to program register A1 with data D1. A bus-idle period may follow as shown in this example.

Register A2 is programmed with data D2 in the next bus cycles, while register A4 is programmed with data D4 in other bus cycles. Finally register A6 is programmed with data D6 in the last bus cycles.

While command FIFO 21 improves efficiency of host-to-register transfers, a large FIFO may be required. Since a register address is stored with each data entry, two entries in command FIFO 21 are needed for each register programmed. One address could be shared over many register accesses using a burst access if all registers in a sequence were accessed, but often registers are not programmed in the sequential burst order. Sometimes only a relatively few registers are written. When even one register in the burst sequence is not written, then burst access may not be possible.

What is desired is more efficient use of a command FIFO to access programmable registers. It is desired to access programmable registers through a command FIFO without storing separate addresses for each register. It is desired to access registers that are not in a sequential burst-sequence order. It is desired to program only a subset of the registers in a sequence while still sharing register address entries in the command FIFO. A more efficient method to access non-sequential programmable registers is desired.

DETAILED DESCRIPTION

The present invention relates to an improvement in using a command FIFO to program registers. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventor has realized that the memory efficiency of a command FIFO can be increased even when non-sequential programmable registers are programmed. When the first entry is for a special index register, the following data entries do not need their own address entries. The first data value sent in the sequence is an index that the controller chip or bitblt engine decodes to determine which registers to write. The controller chip then writes these registers with the remaining data values in the sequence stored in the command FIFO.

The software driver usually knows in advance which registers are going to be programmed, so a list of these registers is generated by the software driver. This list is translated to register fields in the index. Then the software driver writes to the command FIFO at the first address with the index, followed by the data values to written to the programmable registers.

Figure 8:
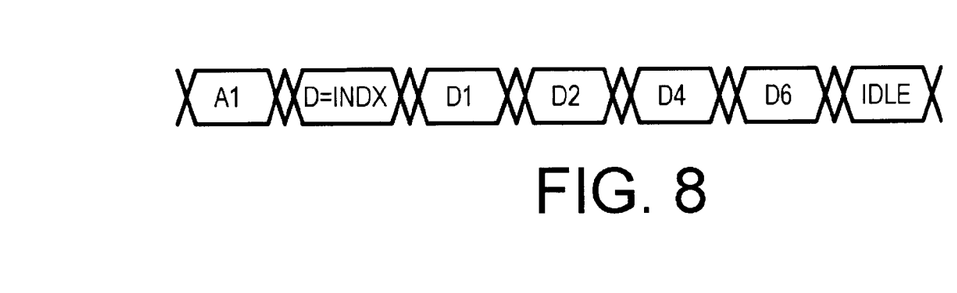
FIG. 8 is a timing diagram of an indexed write to non-sequential programmable registers.

FIG. 8 is a timing diagram of an indexed write to non-sequential programmable registers. During a first bus cycle, the CPU sends the current-entry address of the command FIFO. This is the address of the next entry to be written in the command FIFO. In the second bus cycle, the CPU writes the index. The index appears to the computer system to be the first data value of the burst. However, the controller chip decodes this index to generate a map of which registers to program during the burst.

In the third bus cycle, the CPU writes the data value D1. The data value D2 is written to the command FIFO in the fourth bus cycle, and in the fifth bus cycle, data value D4 is written to the FIFO. During the sixth bus cycle, data value D6 is written.

When the controller chip reads the command FIFO, it assumes that the first data value is the index for the special index register. The controller chip then reads the first data value and decodes it as the index.

The controller chip then routes the next D1 data to the A1 data register, since the index indicated that registers A1, A2, A4, and A6 will be programmed by the burst. The controller chip writes the D2 data to the A2 register. Data value D4 is written to the A4 register, while data value D6 is written to the A6 register in the controller chip.

A total of 6 bus cycles and 6 entries in the command FIFO are required for the non-sequential burst. In comparison with FIG. 7, which required 8 bus cycles and 8 entries, the bus and command FIFO usage is reduced by 25%. When eight registers are programmed for each index, memory usage is improved by 77%. Host CPU efficiency increases since more registers can be written before a FIFO-full interrupt occurs.

After the last data value is read, the next entry in the command FIFO is another index. The process or decoding the mapping fields in this next index can be repeated to program additional registers. Read and write pointers can be kept. Once the read pointer reaches the write pointer, the controller chip has read all values from the command FIFO and can stop reading.

Figure 9:
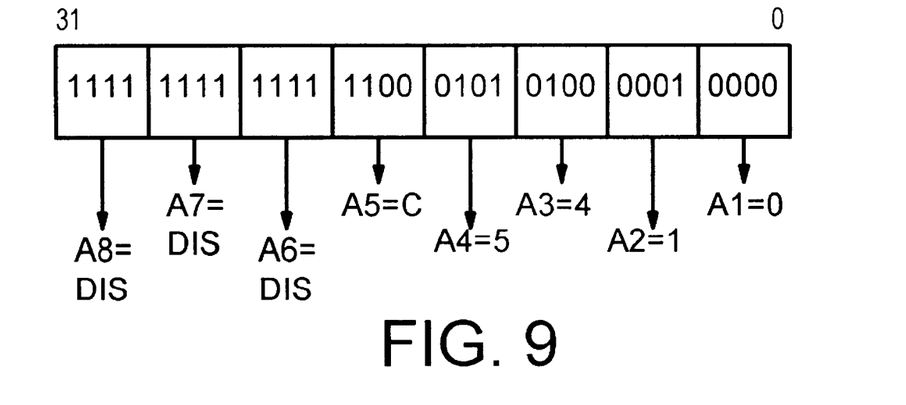
FIG. 9 is a diagram of an index for mapping which of the programmable registers are to be written during a burst.

Mapping Index FIG. 9

FIG. 9 is a diagram of an index for mapping which of the programmable registers are to be written during a burst. A 32-bit index is shown, but other sizes may be used.

A total of eight mapping fields are contained in the index. Each mapping field can enable writing of one programmable register. Thus up to eight programmable registers can be written using one mapping index.

Each mapping field in the index is four bits wide. The four bits are decoded to indicate which register to access. For example, the four least-significant-bits (LSBs) are 0000 and are decoded to indicate access of register 0 (address A1 is 0). The next four LSB's are 0001 and are decoded to indicate access of register 1 (address A2 is 1).

Decoding other mapping fields for A3, A4, and A5 reveal that registers 4, 5, and C (hex) are to be accessed. Thus registers 0, 1, 4, 5, C are to be accessed.

When the four bits in a mapping field are all ones, the mapping field does not indicate access of any register. Instead, the register access is disabled. In this example, the last 3 mapping fields (the MSB's) are each 1111, indicating that the last 3 register accesses are disabled. Only five registers are accessed in this example.

In the example of FIG. 9, registers 0, 1, 4, 5, C are programmed. The other registers 2, 3, 6–9, A, B, D and E are skipped and not accessed by the burst. Thus only 5 of the 15 possible registers are accessed when this example's index is sent to the controller chip.

The registers are accessed in the order determined by the mapping fields. After the index is read, data values D0, D1, D4, D5, DC are sent to the programmable registers in the next 5 bus cycles. These data values are written to programmable registers 0, 1, 4, 5, C by the controller chip.

Once the first address is sent during the first bus cycle in a burst, the addresses of the other data values in the burst are irrelevant. The registers accessed by data written into the command FIFO are determined by the mapping fields in the index.

Figure 10:
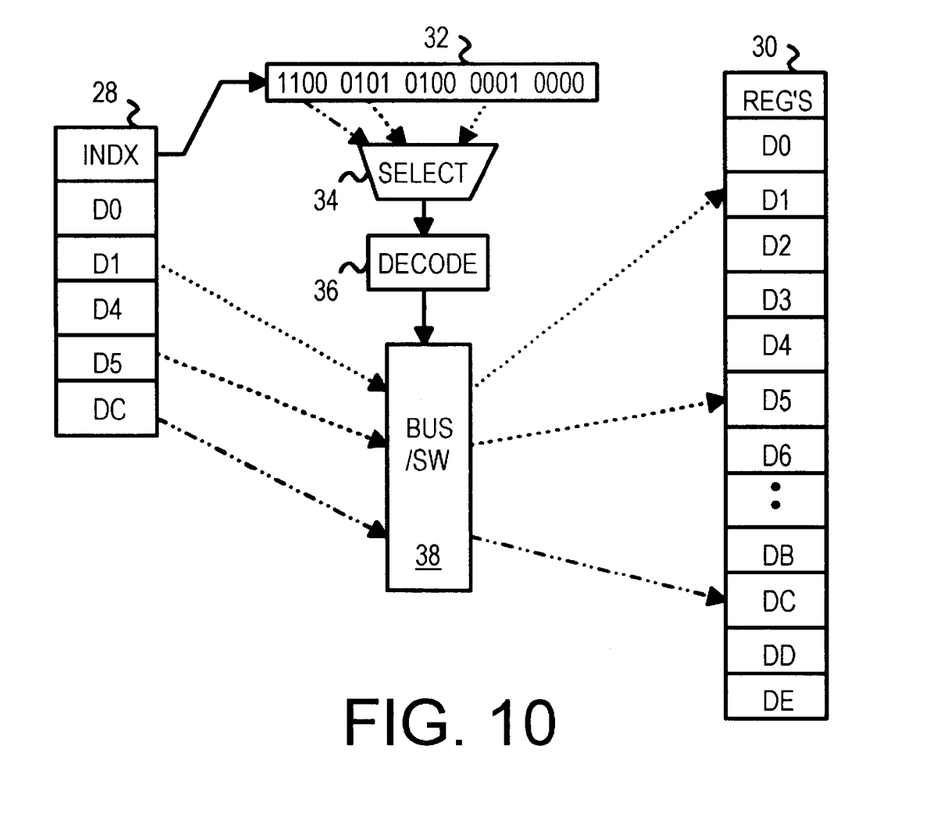
FIG. 10 illustrates register programming using a mapping index rather than separate addresses.

FIG. 10 illustrates register programming using a mapping index rather than separate addresses. Entries 28 in the command FIFO include a mapping index and data to be written to the registers indicated by the mapping index.

The mapping index is copied to index register 32. Selector 34 selects one of the mapping fields in index register 32 for decoding by decoder 36. For example, the LSB mapping field can be decoded first, then the next LSB field, etc.

Decoder 36 sends control signals to bus/switch 38, which selects the first data entry after the mapping index from entries 28. This first data entry is routed over internal buses to the selected register in programmable registers 30. The data entry can be routed to several or all registers and the individual register enabled by a control, select, write, or enable signal from decoder 36. One or more buses may be used.

As successive mapping fields from index register 32 are selected by selector 34, successive data entries in entries 28 are written to selected registers in programmable registers 30. For example, data D0 is written to register 0, data D1 is written to register 1, data D5 is written to register 5, and data DC is written to register C. Not all registers have to be written, and the order registers are written may be non-sequential. For example, register 5 could be written before register 1.

Figure 11:
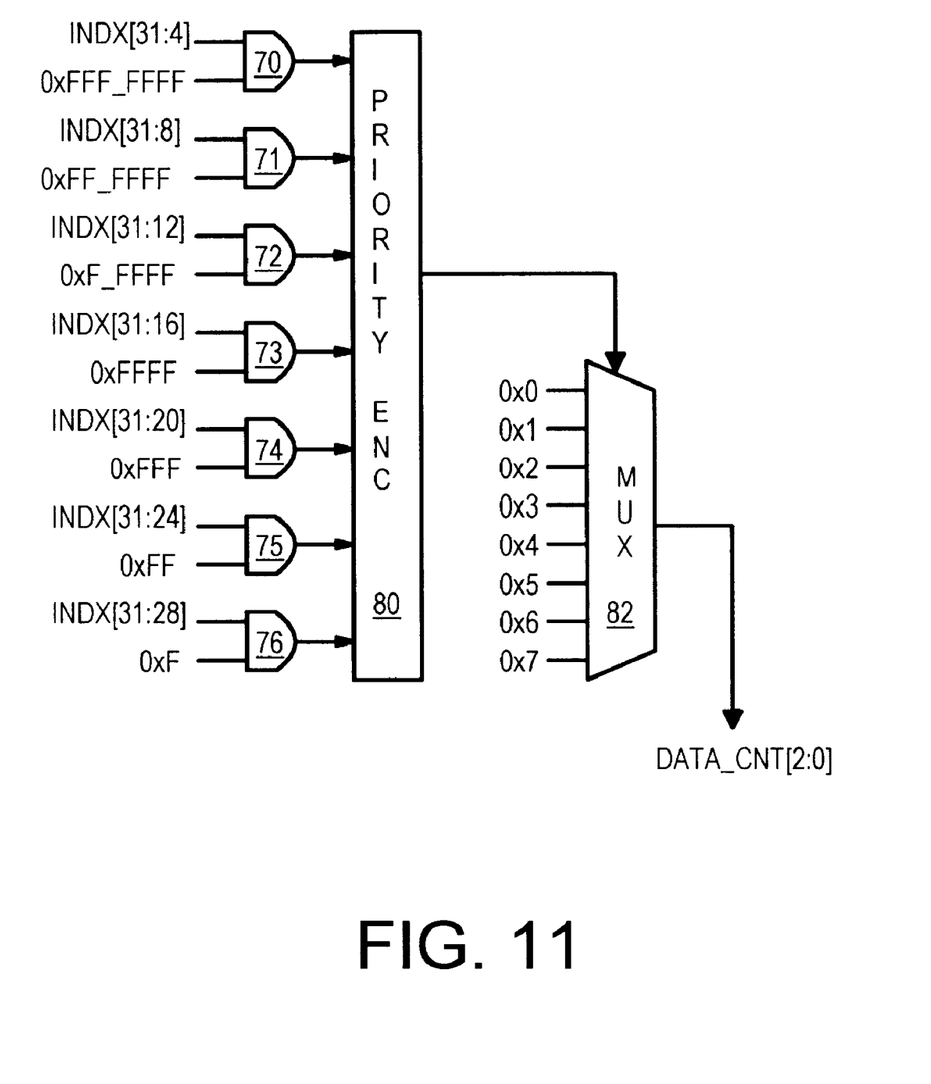
FIG. 11 is a diagram of a mapping-index decoder that determines a number of registers to be programmed.

FIG. 11 is a diagram of a mapping-index decoder that determines a number of registers to be programmed. Other decoders can be substituted. In this example, the mapping index must always program at least one register. The upper 28 bits of the mapping index, INDEX[31:4], are compared to ones by AND gate 70. When all 28 MSB's are one, AND gate 70 outputs a one to priority encoder 80, which causes mux 82 to output its highest input, 0x0. This sets the data count to 0, indicating that only one register is to be programmed.

When the upper 28 bits of the index are not all ones, AND gate 71 examines the upper 24 bits. When these upper 24 bits are all ones, AND gate 71 outputs a one to priority encoder 80, which causes mux 82 to output 0x1, indicating that 2 registers are to be programmed.

AND gates 72–76 similarly examine smaller numbers of 4-bit mapping fields of the index. The first (most-significant) zero is thus encoded by priority encoder 80 and mux 82 to indicate the number of registers to be programmed. When all mapping fields contain a zero, then all 8 registers are to be programmed. Priority encoder 80 causes mux 82 to output 0x7 to indicate a data count of 8.

Figure 12:
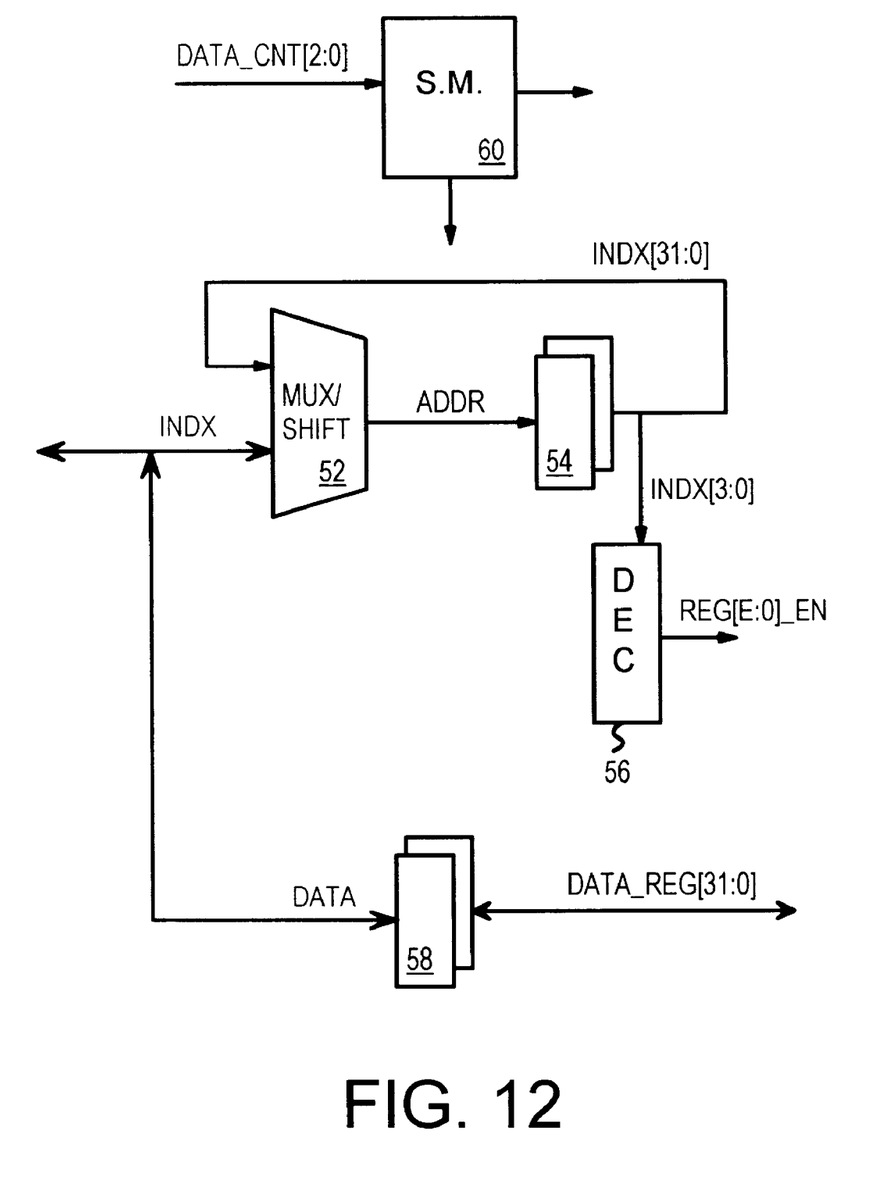
FIG. 12 is a diagram of a register programmer that uses a mapping index to select registers for programming.

FIG. 12 is a diagram of a register programmer that uses a mapping index to select registers for programming. The data count indicates the number of register to be programmed from the current mapping index. This data count is input to state machine 60 to determine the number of cycles needed to program the registers. State machine 60 generates sequences of control signals (not shown) such as bus and register enables to transfer data to and from the programmable registers.

When the first entry is read from the command FIFO, the first entry contains the index. The first data entry is latched into index register 54 through mux/shifter 52. The lowest four bits of the index from index register 54 are extracted and decoded by decoder 56 to enable one of the 15 register-enable signals REG[E:0]$_{13}$ EN. Thus the first mapping field is decoded to select the first register to be accessed. The next data entry read from the command FIFO is latched into data registers 58 and written to the selected register.

The mapping index is then shifted down by one mapping field. The mapping index from index register 54 is fed back to mux/shifter 52, which shifts the index down by four bits so that the second mapping field occupies the lowest four bits. These new lowest four bits are then decoded by decoder 56 to generate the next register-enable signal REG[E:0]_EN for the second mapping field. The next data entry read from the command FIFO is latched into data registers 58 and written to the selected register.

Mux/shifter 52 then shifts the index from index register 54 down by another four bits, allowing the third mapping field to be decoded by decoder 56. The third register is then written or read. This process of shifting the mapping index and accessing the register indicated by the shifted mapping field continues until all registers have been programmed. The end of programming can be detected by decoder 56 finding a mapping field containing all ones, or by the data count being reached by state machine 60.

Data registers 58 can be eliminated when no pipelining is used, or additional levels of pipeline registers can be used. Data registers 58 could be replaced with a data FIFO. The decoder and register-enables could also be pipelined.

ALTERNATE EMBODIMENTS

Several other embodiments are contemplated by the inventor. For example, several different mapping index words may be used, each with a different starting address or different command FIFOs for a different bank of registers. The second mapping index word may refer to the next set of registers that are offset by an additional 15 registers or some other offset. When all mapping indexes in the first index are 0xF, then no registers in the first bank are programmed. Alternately, another bank field may be added to the index to indicate which bank is to be programmed. This bank field can be decoded to select one bank from among several banks. The bank field could be located in a programmable register rather than in the index, or some other means such as an I/O pin could be used to select banks. Byte, word, double-word, or other addressing may be used. Additional restrictions may be placed on the mapping index word, such as requiring that the disabled mapping fields be the MSB's or that at least one mapping field be enabled.

The address and the data may be input on separate busses rather than a shared bus, or on shared or separate signal lines. The address may arrive slightly before the data but with some overlap. Then a separate bus cycle may not be needed to latch the address.

Different register and addressing sizes can be used. The smallest addressable unit may be a byte, but some systems may address only 16-bit, 32-bit, or 64-bit words as the smallest writeable unit. The index register may be 32 bits, while the data register also 32 bits. A 64-bit read can also be used to read two data registers in one bus cycle. Sixteen-bit programmable registers are also possible as are other sizes.

Burst cycles could be used by the controller chip when reading the command FIFO, depending on the bus used between the FIFO and registers in the controller chip. The controller chip or bitblt engine can have logic to decode the mapping index and write or read the indicated registers, so addresses are not needed for each register access. The controller chip may be a graphics engine such as a BitBlt engine, a 2D or 3D graphics accelerator, an MPEG engine, or other kinds of engines.

Registers may be accessed by reading rather than writing using additional logic. The CPU has been described as using burst cycles to send data to the command FIFO. When the CPU does not use burst cycles to write the command FIFO, the CPU sends the index as the data with the first address, which is the address to the write pointer in the command FIFO. Then the CPU sends the first data value in another cycle, but increments the write pointer and writes to the following entry in the command FIFO. Subsequent writes are to subsequent address locations in the command FIFO.

The command FIFO may be a software buffer located anywhere in memory that is written by the host CPU and read by the controller chip. The read pointer address can be advanced by the controller chip while the write pointer addresses is advanced by the host CPU as each index and data value is written into the FIFO. Boundary addresses for the command FIFO can also be kept and referenced to determine when to wrap pointers around at the end of the buffer. The command FIFO could also be a hardware FIFO that uses hardware-based pointers or even shift registers. Then the host can write all index and data values to the same address, the address of the top of the FIFO.

The index register does not have to be the same width as the data registers. For example, a 32-bit index register with 4-bit mapping fields can be used to program up to eight of fifteen 64-bit data registers. A 64-bit index register can program up to 10 data registers in a bank of 63 registers using 6-bit mapping fields, and those data registers can be any size. Multiple index registers can be separately addressed, each controlling a different bank or set of data registers. The encoding of the index word may be varied with binary, gray-code, or other encodings that identify which of the programmable registers are to be written. The programmable registers could span several chips.

Many different I/O addresses can be used for the index and data registers. An indexing scheme may be used where the address is first written to an index or control register, then the data is written to a single data register and routed to the correct data register identified by the index. The mapping index word could point to non-consecutive data registers that are normally accessed by a 2-step indexing scheme, thus bypassing the index. The invention may be applied in a highly-integrated chip, such as a graphics controller integrated together with a systems-logic controller that includes the command FIFO.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A graphics engine comprising:
  a command first-in-first-out FIFO for storing entries written by a host, the entries being commands and data to the graphics engine from the host, the entries including a first entry that is an index value, and a plurality of data entries, the first entry being written to an address of the command FIFO;
  an index register, written with the index value from the first entry;
  a selector, coupled to the index register, for selecting a multi-bit mapping field from the index register, wherein the index value contains a plurality of multi-bit mapping fields each capable of indicating a different register in a bank of programmable registers;
  a decoder, coupled to receive the multi-bit mapping field selected by the selector from the index register, for decoding the multi-bit mapping field to indicate a selected register in the bank of programmable registers; and
  a switching bus, coupled to transfer one of the plurality of data entries from the command FIFO to the selected register to write a data value to the selected register;
  wherein the plurality of data entries from the command FIFO are written to several different selected registers in the bank of programmable registers by the selector selecting different multi-bit mapping fields from the index register and the decoder decoding different multi-bit mapping fields to cause the switching bus to write the data entries to the several different selected registers,
  whereby the multi-bit mapping fields in the index register are selected and decoded to write data values to the several different selected registers in the bank of programmable registers.

2. The graphics engine of claim 1 wherein the index value contains at least 8 multi-bit mapping fields.

3. The graphics engine of claim 2 wherein each multi-bit mapping field is at least four bits;
  wherein the bank of programmable registers includes at least 15 registers that can be selected as the selected register for programming with a data value;
  wherein the data entries include up to eight data values for programming up to 8 of the 15 registers using the entries that include the index value,
  whereby up to eight registers in a bank of 15 registers can be programmed with one index value.

4. The graphics engine of claim 1 wherein each multi-bit mapping field is N bits;
  wherein the bank of programmable registers includes at least $2^N-1$ registers that can be selected as the selected register for programming with a data value;
  wherein the data entries include up to $2^{N-1}$ data values for programming up to $2^{N-1}$ of the $2^N-1$ registers using the entries that include the index value,
  whereby up to $2^{N-1}$ registers in a bank of $2^N-1$ registers can be programmed with one index value.

5. The graphics engine of claim 4 wherein the entries stored in the command FIFO include a plurality of entry groups, each entry group containing up to $2^{N-1}$ data entries in the plurality of data entries and one index entry,
  wherein each entry group can program up to $2^{N-1}$ selected registers using $2^{N-1}+2$ entries in the command FIFO.

6. The graphics engine of claim 5 wherein when at least one of the multi-bit mapping fields contains a disabling value, fewer than $2^{N-1}$ selected registers the bank of programmable registers are written with the plurality of data entries,
  whereby the disabling value in a multi-bit mapping field reduces a number of register programmed.

7. The graphics engine of claim 6 wherein the multi-bit mapping field contains all ones to indicate the disabling value.

8. The graphics engine of claim 7 further comprising:
  compare logic that compares the multi-bit mapping field to the disabling value and disables writing the data value to the selected register when the multi-bit mapping field contains the disabling value.

9. The graphics engine of claim 6 further comprising:
  a priority encoder coupled to a plurality of compare logic that compares several multi-bit mapping fields in the index value to the disabling value, for determining a count number of multi-bit mapping fields that do not contain the disabling value;
  wherein the switching bus programs the count number of data values into the count number of selected registers.

10. The graphics engine of claim 6 further comprising:
  a shifter, coupled to the index register, for shifting the index value to apply a
  different multi-bit mapping field to the decoder in different cycles,
  whereby the index value is shifted over the different cycles to decode different multi-bit mapping fields in the index register.

11. The graphics engine of claim 10 wherein the host is a central processing unit CPU and the graphics engine is a bit-block-transfer BitBlt engine and the command FIFO is a memory between the host and the BitBlt engine.

12. A method for programming registers comprising:
  sending an address value used to address a first entry in a command FIFO;
  writing an index value to the first entry in the command FIFO;

writing a first data value to a second entry in the command FIFO;

writing a second data value to a third entry in the command FIFO;

reading the first entry from the command FIFO;

reading the index value from the first entry in the command FIFO and writing the index value to an index register;

selecting and decoding a first mapping field in the index register, the first mapping field having multiple bits that encode a first register offset that identifies a first selected register in bank of programmable registers;

transferring the first data value in the second entry from the command FIFO to the first selected register to write the first selected register with the first data value;

selecting and decoding a second mapping field in the index register, the second mapping field having multiple bits that encode a second register offset that identifies a second selected register in bank of programmable registers;

transferring the second data value in the third entry from the command FIFO to the second selected register to write the second selected register with the second data value.

13. The method of claim 12 further comprising:

comparing a third mapping field in the index register to a predetermined disable value;

when the third mapping field matches the predetermined disable value, programming a different bank of programmable registers by reading a different first entry from the command FIFO.

14. The method of claim 12 further comprising:

writing a third data value to a fourth entry in the command FIFO;

writing a fourth data value to a fifth entry in the command FIFO;

selecting and decoding a third mapping field in the index register, the third mapping field having multiple bits that encode a third register offset that identifies a third selected register in bank of programmable registers;

transferring the third data value in the fourth entry from the command FIFO to the third selected register to write the third selected register with the third data value;

selecting and decoding a fourth mapping field in the index register, the fourth mapping field having multiple bits that encode a fourth register offset that identifies a fourth selected register in bank of programmable registers; and transferring the fourth data value in the fifth entry from the command FIFO to the fourth selected register to write the fourth selected register with the fourth data value, whereby at least four selected registers are programmed using one index value.

15. A programmable controller comprising:

memory means for storing a plurality of entries from a host, the entries including groups of entries that include a plurality of data entries;

wherein each group of entries has multiple data entries;

index register means for storing a mapping index that is a data entry in the current group of entries;

select means, coupled to the index register means, for selecting a current mapping field from a plurality of mapping fields in the mapping index;

decode means, coupled to the select means, for decoding multiple bits in the current mapping field to identify a current register for programming;

data transfer means, responsive to the decode means, for transferring one of the plurality of data entries from the current group of entries to the current register to program the current register; and sequencing means for instructing the select means to select another mapping field from the plurality of mapping fields in the mapping index as the current mapping field, the decode means decoding the multiple bits in the current mapping field to identify another current register, the data transfer means transferring another one of the plurality of data entries from the current group of entries to the another current register to program the another current register, whereby multiple registers are programmed from data entries in the current group of entries.

16. The programmable controller of claim 15 further comprising an address match means for causing the decode means to identify current registers from a different bank of programmable registers when an address corresponds to a different bank of programmable registers, wherein the address is an address of the command FIFO or an address field in an index entry in the command FIFO that contains the mapping index.

17. The programmable controller of claim 15 wherein the mapping index contains a plurality of at least eight mapping fields, wherein the select means can select up to eight different registers as the current register, whereby up to eight registers are programmed from the current group of entries.

18. The programmable controller of claim 17 wherein registers are programmed in a sequential or in a non-sequential order wherein registers can be skipped over during programming by a group of entries.

19. The programmable controller of claim 17 wherein the registers can be programmed in any order.

20. The programmable controller of claim 17 wherein the memory means comprises a command FIFO for storing graphics data and commands to the programmable controller.

* * * * *